March 18, 1947.　　　H. D. KADZ　　　2,417,502
WINCH
Filed Aug. 31, 1943　　　3 Sheets-Sheet 3

HARALD D. KADZ,
INVENTOR.

BY Edwin D. Jones,
ATTORNEY.

Patented Mar. 18, 1947

2,417,502

UNITED STATES PATENT OFFICE 2,417,502

WINCH

Harald D. Kadz, Glendale, Calif., assignor to Kay-Brunner Steel Products, Inc., a corporation of Delaware Application August 31, 1943, Serial No. 500,654

4 Claims. (Cl. 254—185)

My invention relates to winches for hoisting and pulling devices positioned at a distance thereto and capable of operation by cables. It has particular reference to winches adapted for attachment to tractors to be carried and operated thereby for actuating excavating devices of roadway excavating machines towed by the tractors, and to permit complete control of the winches by the operators of the tractors.

It is a purpose of my invention to provide a winch of the double or single drum type which is structurally characterized by the arrangement at the front or tractor end of the drum of a transmission mechanism for driving the drum, and at the rear of the drum of a clutch and a brake, the former for operatively connecting the transmission to the drum and the latter for stopping rotation of the drum, and whereby because of such arrangement the brake and clutch are rendered readily accessible for inspection and adjustment, and the possibility of the brake and clutch becoming contaminated by grease from the transmission mechanism is rendered nill.

It is also a purpose of my invention to provide a single or double drum winch of the type above described in which the clutch and brake and the operating means therefor, are all mounted on a frame which is secured to but readily detachable from the housing for the transmission mechanism, and which frame when detached allows access to the parts of the brake, clutch and the operating means for purposes of repair and replacement without opening or otherwise disturbing the transmission housing or the mounting for the winch drum, and thereby eliminating the possibility of grease or oil leakage from the housing or mounting incident to such frame detachment.

A further purpose of my invention is the provision of a winch in which the frame because of its open or skeleton-like construction, and the aft positioning of the brake and clutch, a freer circulation of air is permitted about the brake and clutch resulting in greater radiation of heat and thus lessening the possibility of the brake and clutch linings burning.

A still further purpose of my invention is the provision in a winch of a fairlead sheave mounting positioned on the top of the winch frame, and beneath which latter the operating shaft for the clutch and brake are mounted, such arrangement affording the advantage of preventing the cable which passes rearwardly from one of the sheaves, from becoming entangled in the operating shaft.

Another purpose of my invention is the provision of a sheave mounting which is so constructed as to permit of the ready demounting and mounting of the fairleads therein, and when the sheave mounting is attached to the winch the fairleads are secured against accidental displacement.

Another purpose of my invention is the provision of a winch of the double drum type, wherein should the winch be coupled to a tractor whose power take-off shaft only rotates in a direction contrary to that necessary to drive the drums in the directions intended to operate the cables as required, certain parts of the transmission mechanism can be readily reversed in arrangement to compensate for such contrary rotation of the power take-off shaft, and thus cause the drums to be still driven in the intended directions.

I will describe only one form of winch and one form of sheave mounting, each embodying invention, and will then point out the novel features thereof in claims.

In the accompanying drawings.

Similar reference characters refer to similar parts in each of the several views.

Figure 1:
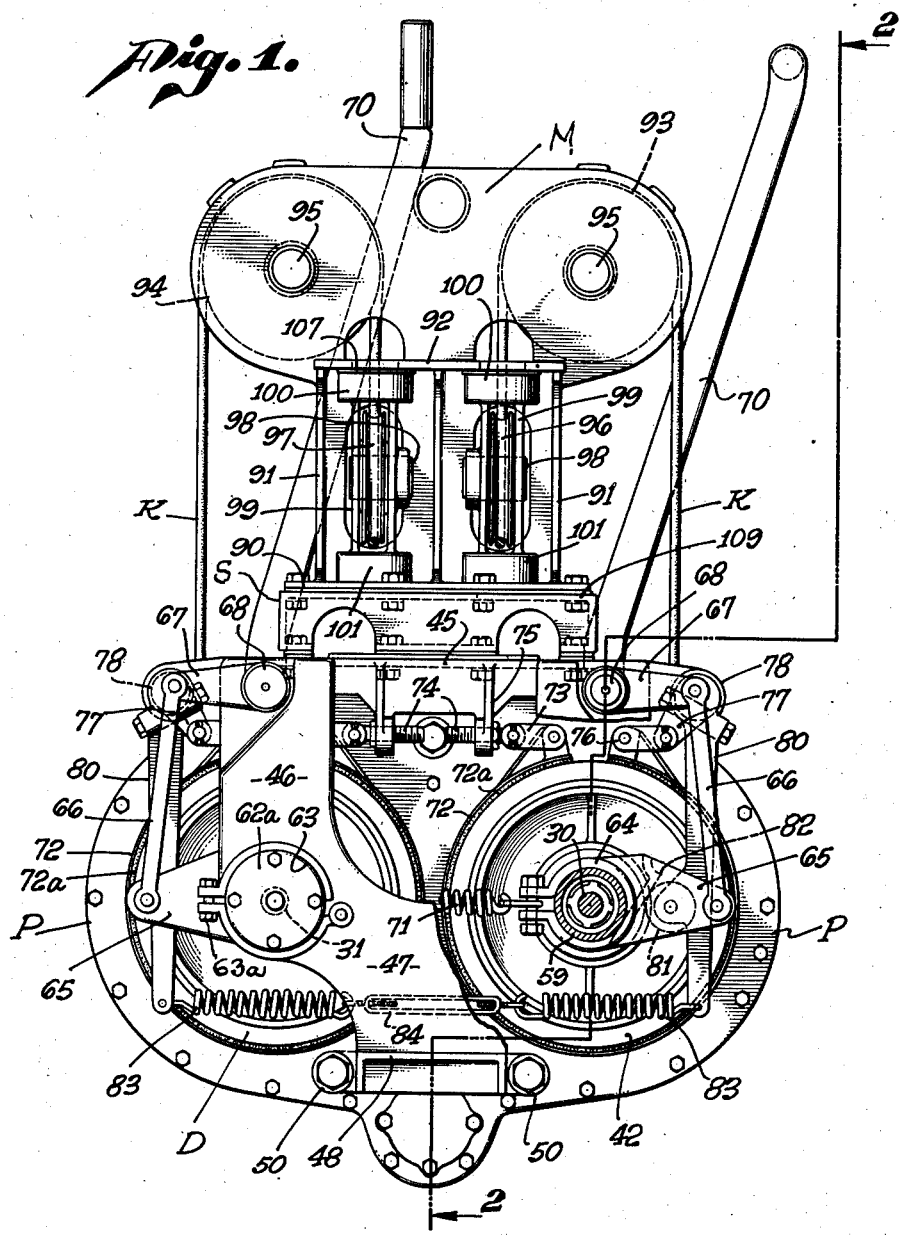
Fig. 1 is a view showing in rear elevation and partly in section one form of winch embodying my invention.

The winch herein illustrated is of the double drum type, although it will be understood that it is within the scope of my invention to so modify the main structural elements thereof as to adapt my invention to a single drum winch.

The winch is shown as comprising an adaptor plate 15 by which the winch as a unit is adapted to be secured to the rear end of a tractor. Secured to this adaptor plate and extending rearwardly therefrom, are right and left brackets 16, 16 to which are secured right and left integral transmission housings H, H closed at their rear sides by a common cover plate P which is bolted thereto as shown. Extending between the adaptor plate 15 on the forward side of the housing H, is a housing 17 into the forward end of which extends a power take-off shaft 18, it being understood that this shaft is adapted to be driven by the tractor on which the winch is mounted.

The shaft 18 is operatively connected by a splined coupling 19 to the forward end of a shaft 20 for driving the transmission mechanism contained in the housings H for actuating the two winch drums. This mechanism in the present instance, comprises a pinion 21 fixed to the shaft 20 with the latter journaled in bearings 22 and 23 and the pinion meshing with a gear 24 fixed on a shaft 25 journaled in bearings 26 and 27. The shaft 25 has fixed thereto a pinion 28 which meshes with a relatively large gear 29 fixed to a main drive shaft 30 for driving one of the winch drums. To drive the other winch drum, a second main drive shaft 31 is provided to which is fixed a gear 32, this gear constantly meshing with the gear 29 as shown in dotted lines in Fig. 3.

As the construction of the two winch drums, the drive shafts therefor, and the mountings for the latter are the same in each case, a description of one will suffice for both. As shown in Fig. 1 the main drive shaft 30 is journaled in bearings 33 and 34 at the forward end thereof, and in a bearing 35 at the rear end thereof. By means of bearings 36 and 37 a cable drum D is journaled on a hub 38 through which the shaft 30 extends, and oil sealing rings 39 and 40 are provided to seal the bearings 36 and 37 against the escape of oil.

The forward end of each drum D is provided with an annular flange 41, and its rear end with an annulus 42 having a concentric outer periphery 43, and a conical inner periphery 44, the purpose of which will be described hereinafter.

For supporting the rear ends of the main drive shafts 30 on the transmission housings H, as well as clutches and brakes, one for each of the cable drums, and the operating means for the clutches and brakes, a single and integral frame designated generally at Y, is provided. This frame in the present instance, comprises an upper portion 45 from the rear end of which depend two vertical and offset portions 46 spaced one from the other and connected at their lower ends by a portion 47, while curved forwardly from the portion 47 is a horizontal bottom portion 48. The several portions of the frame Y are flanged for reinforcing purposes, and the forward end of the upper portion 45 is provided with depending ears 49, through which suitable bolts extend for securing this portion of the frame to the upper part of the plate P. The lower frame portion 48 is likewise provided with ears 50, which are bolted to the lower portion of the plate P. The bolts for all of the ears (five in number in the present instance) are all readily accessible to permit quick detachment of the frame from the plate P, an advantage which will become apparent as the description proceeds.

As previously stated herein each cable drum is provided with a clutch and a brake, the clutch forming an operative connection between the drive shaft 30 and the cable drum, and the brake stopping rotation of the drum concurrently with disengagement of the clutch from the drum.

As best shown in Fig. 1, each clutch comprises a lining 51 riveted on a conical member 52 having a hub 53 splined on the shaft 30 to allow the clutch member to engage and disengage the inner periphery 44 of the annulus 42. An adjusting nut 54 is threaded on the adjacent end of the housing 38, and the joint between this nut and the clutch 53 is closed by an oil seal 55. The hub 53 is constructed with an annular pocket 56 containing a bearing 57 for a sleeve 59 which is confined in the pocket by a nut 60.

The sleeve 59 has threaded engagement with a clutch adjusting sleeve 61 fixed on an adjusting and pocketed nut 62, the shaft 30 extending freely through the sleeve and into the nut pocket where it is supported by the bearing 35. The pocket for the nut is closed by a cap 62a and the nut is embraced by a two part clamp 63 one part of which is fixed on the frame portion while the other part is pivoted thereon as shown. By means of a bolt 63a the pivoted part of the clamp can be caused to securely clamp the nut in any adjusted position to in turn secure the sleeve 61 in that adjusted position necessary to effect proper engagement of the annuli 42 by the clutch member 52.

To the sleeve 59 is clamped a split collar 64 having an arm 65 which by a link 66 is connected to an arm 67 fixed to the rear end of a shaft 68. This shaft extends beneath the top yoke portion 45 and is journaled in suitable bearings 69 for manual rotation by a lever 70 pinned to the forward end thereof.

A spring 71 common to the split collars 64 for both clutches, urges each sleeve 59 in a counterclockwise direction, as when viewed in Fig. 1, to maintain the clutch member 52 out of engagement with the annulus 42. However, by rotation of the collar in the opposite direction and against the tension of the spring 71, the threads of the two sleeves 59 and 61 coact to retract the sleeve 59 and thus move the clutch member out of engagement with the annulus. Such operation of the split collar is effected by operation of the lever 70 to so rotate the shaft 68 that the link 66 is moved downwardly from the position shown in Fig. 1.

The brake for each cable drum comprises a split band 72 and a liner 72a extending about the outer periphery 43 of the annulus 42. One end of the band is connected by a link 73 to an adjusting screw 74, which is threaded in a bracket 75 secured to the top yoke portion 45. The other end of the band is connected by a link 76 to an arm 77 fixed to a stub shaft 78 journaled in ears 79 formed on the upper yoke portion 45. Fixed to the stub shaft 78 is the upper end of an arm 80 carrying adjacent its lower end a roller 81 which contacts with a cam 82 fixed on the arm 65. The lower end of the arm 80 has connected thereto a spring 83, the latter in turn being connected to an identical spring 83 for the other arm 80 by a turn buckle 84, whereby the tension of the springs may be adjusted as required. The spring 83 serves to urge the roller 81 against the cam 82 and the arm 77 inwardly to constrict the band into braking engagement with the annulus.

From the preceding description of the operation of the clutch, it will be clear that when operating the lever 70 to cause the clutch 52 to engage the annulus 42 and thus operatively connect the drive shaft 30 to the cable drum to effect driving of the latter, the arm 65 is moved downwardly to actuate the cam 82 and move the arm 80 outwardly against the tension of the spring 83. This rotates the stub shaft 78 to move the link 76 outwardly thereby expanding the band 72 out of braking engagement with the annulus. Thus, according as the clutch engages or disengages the annulus, to operatively connect or disconnect the cable drum to or from the drive shaft, the brake is concurrently moved out of or into braking engagement with the annulus to release the drum or lock it against rotation. As the operating mechanism for the clutch and the brake of each cable drum is operable through the respective lever 70, the two mechanisms are operable independently of each other so that either one cable drum or the other can be driven or locked against rotation at the will of the operator.

From the preceding description of the construction and arrangement of parts of the winch, and their mode of operation, it becomes manifest that my winch provides many advantages among which are the following:

The brakes and clutches being rearwardly of the transmission mechanism, and remotely therefrom, are readily accessible for inspection and adjustment, and because of the interposed cable drum and the grease seals there is no possibility of the brake and clutch linings becoming contaminated by grease.

By virtue of the open construction of the frame coupled with the aft arrangement of the brakes and clutches, rapid radiation of heat is effected to prevent burning of the clutch and brake linings. Also, the frame construction makes accessible those parts of the brakes and clutches requiring adjustment from time to time.

By the simple process of removing the bolts from the ears 49 and 50, the frame and the elements which it supports are removable without disturbing the housings H, and the transmission mechanism, so that no oil or grease leakage is possible during or following such removal. With removal of the yoke all parts of the brakes and clutches are rendered accessible for replacement and repair, as well as the mechanism for operating them.

A very important advantage of my invention resides in the reversibility of certain parts of the transmission mechanism to compensate for different directions in rotation of the power take-off shafts of various makes of tractors. Let it be assumed that in order to wind the cables on the drums, as intended, it is necessary that the right hand drum in Fig. 3, be driven in a clockwise direction, and the left hand drum in the reverse direction. To accomplish this where the power take-off shaft is driving in such direction that the pinion 28 is driven in a counter-clockwise direction, the shaft 30 and its gear 29 which is of such diameter as to constantly mesh with the pinion, are associated with the right hand drum, while the shaft 31 and its gear 32 which is of such diameter that it cannot mesh with the pinion, but meshes with the gear 29 to be driven thereby in the opposite direction, are associated with the other drum.

Figure 3:
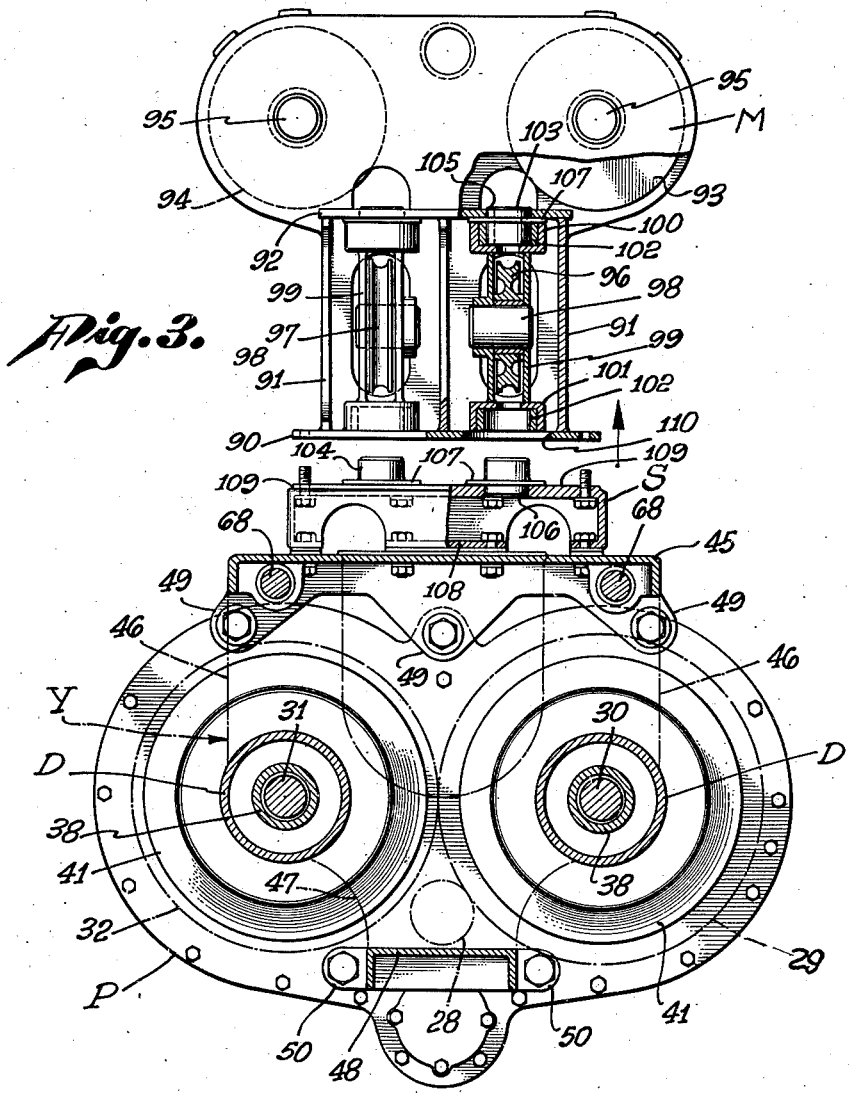
Fig. 3 is a vertical sectional view taken on the line 3—3 of Fig. 2, and with the sheave mounting in detached position in relation to the winch.

Now should the winch be coupled to a tractor where the power take-off shaft thereof is driven in the opposite direction so that the pinion 28 is driven in a clockwise direction as when viewed in Fig. 3, the drums can still be driven in the directions required to wind the cables as intended. This is accomplished by detaching the transmission housing H from the plate P thereby allowing the shafts 30 and 31 with the gears 29 and 32 thereon, to be pulled forwardly out of the drums then reversed as to the drums and reinserted into the latter without removing the gears from the shafts. Thus the large gear 29 for the left hand drum now meshes with the pinion 28, while the smaller gear 32 for the right hand drum again meshes with the gear 29. By this reversed arrangement of shafts and gears, the pinion 28 although driven in a clockwise direction will through the gears, drive the right hand drum in a clockwise direction, and the left hand drum in the opposite direction.

It is important to note that removal of the shafts 30 and 31 incident to the aforedescribed gear reversal, does not disturb the normal arrangement of drums, clutches, brakes, and operating mechanisms therefor, and thus the shafts with the gears can be placed in their new positions without difficulty.

The operating mechanism for each clutch and its companion brake, is mounted in the main on the frame, and its mode of operation is such that according as the cable drum is clutched or declutched, it is immediately released or engaged by the brake, thus providing instant control of the drum and its cable.

Figure 2:
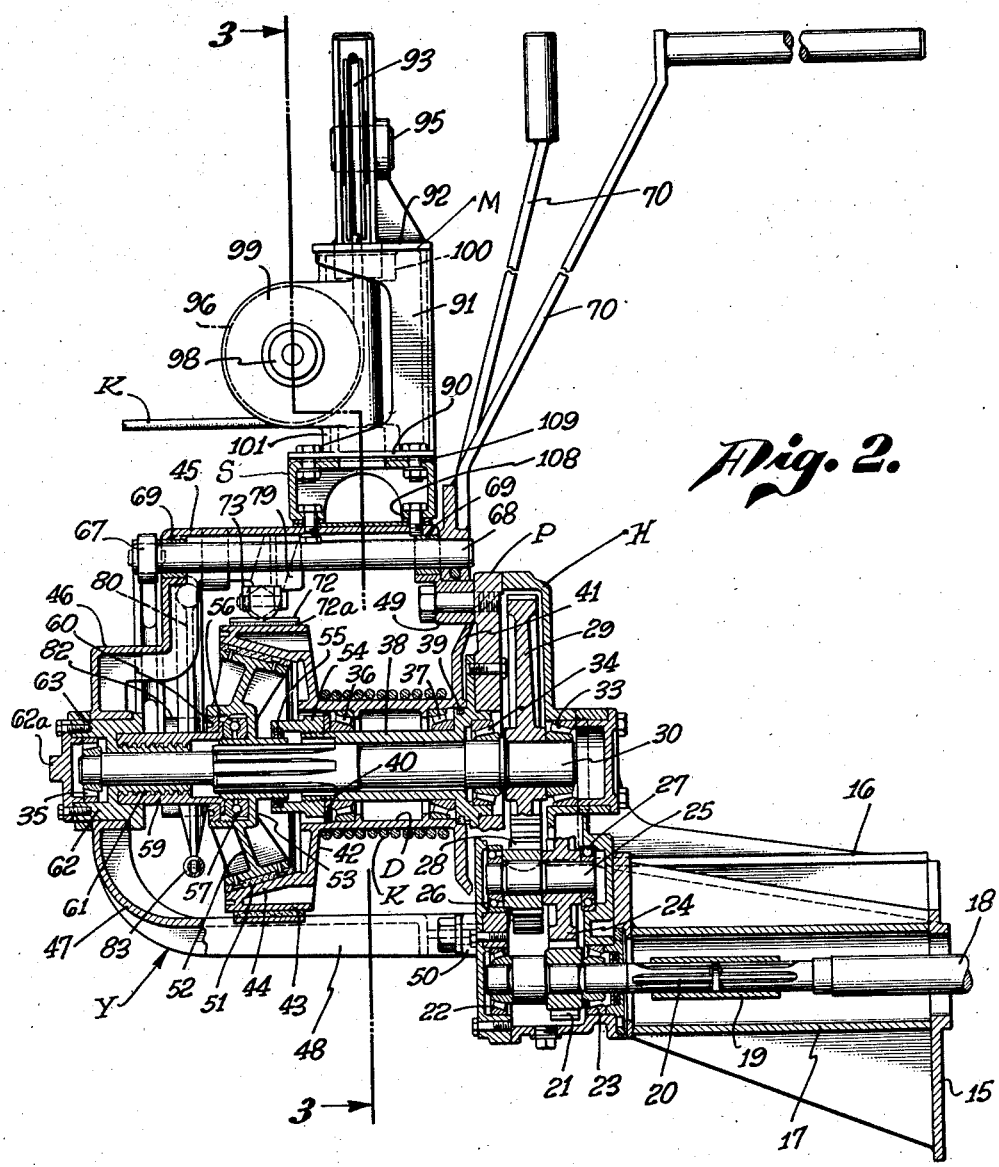
Fig. 2 is a vertical sectional view taken on the line 2—2 of Fig. 1.

The top portion 45 of the frame Y provides a platform upon which may be secured a mounting for a plurality of sheaves around which the two cables K on the drums D are adapted to pass in the manner illustrated in Figs. 1 and 2. This sheave mounting is characterized structurally by its simplicity, and the easy manner in which the fairlead sheaves may be applied to or removed from the mounting. In the present instance, this mounting comprises a frame having a lower plate 90 from which rises a plurality of spaced legs 91 connected at their upper ends by an upper plate 92. The plate 92 is cast integral with a housing and mounting M for sheaves 93 and 94, the parallel and horizontal axles 95 of which are journaled in the housing. Within the plates 90 and 92, and between the legs 91, are pivotally mounted for rotation about spaced vertical axes, two fairlead sheaves 96 and 97. Each sheave 96 or 97 has a stub shaft 98 rotatable in a shroud 99 provided at its upper and lower ends with bearing collars 100 and 101, respectively, with liners 102 receiving bearing pins 103 and 104, respectively, which are seated in openings 105 and 106, respectively. The bearing pins are formed with flanges 107 by which their axial movements in the openings 105 and 106 are limited.

In order to elevate the sheave mounting on the frame Y so that the sheaves 95, 96, and 97 may occupy higher positions to allow the cables K to properly actuate earth moving devices on a particular form of excavating apparatus being towed by the tractor to which my winch is attached, a spacer S is interposed between the sheave mounting and the yoke portion 45.

This spacer may comprise a box-like frame with a lower part 108 bolted to the frame portion 45, and an upper part 109 bolted to the plate 90. The aforementioned opening 106 is formed in the upper frame part 109, but to allow the lower bearing collar 101 to be seated on the lower bearing pin 104, the lower plate 90 is formed with a relative large opening 110 through which the bearing pin extends when the sheave mounting is bolted to the spacer as shown in Fig. 1.

From the aforedescribed construction it will be clear that when the sheave mounting is detached from the spacer, and elevated as shown in Fig. 3, the two bearing collars 101 for the sheaves 96 and 97 are disengaged from the pins 104. This allows each collar 101 to drop into its respective opening 110, and with it the shroud and sheave descend a distance sufficient to cause the upper pin 103 to be withdrawn from the plate 92. With the shroud 99 in this lowered position, it is free to be moved to an angular position in which it can be removed from the mounting. Thus the whole sheave and its mounting are removable for replacement or repair. Manifestly, the sheaves are assembled in the mounting by reversing the aforedescribed operation, and thus the easy mode of application and removal of the fairlead sheaves to or from the mounting becomes apparent.

Where elevation of the sheaves and their mounting is not required, it will be understood that the spacer may be dispensed with, and the bottom plate 90 bolted directly to the frame portion 45, and the latter formed with the bearing pin receiving openings 106.

The sheave mounting being supported on the frame Y is removable therewith if desired, but being detachably secured thereto can be removed independently of the frame. Another advantage resultant of supporting the sheave mounting on the frame, is that the cables K where they leave the sheaves 96 and 97, cannot become entangled with the shafts 68 because of the interposed frame.

I claim:

1. A winch, comprising: a pair of drums; a pair of shafts for driving said drums; a first gear fixed to one of said shafts; a smaller gear fixed to the other of said shafts and meshing with said first gear; a driving pinion meshing with said first gear so that when driven in one direction the latter will be rotated to drive said shafts in opposite directions; and means for mounting said shafts so that they together with said gears can be withdrawn therefrom and inserted in opposite drums, whereby said first gear is again placed in mesh with said pinion and said smaller gear again placed in mesh with said first gear, so that when said pinion is driven in the other direction said shafts will be driven in the same opposite directions as before.

2. A winch, comprising: a pair of cable drums; a driving pinion at one end of said drums; a pair of shafts for driving said drums from said pinion; two intermeshing gears fixed to said shafts only one of which is of a diameter to mesh with said pinion; and means correlated to said shafts and said drums allowing removal of said shafts from said drums and insertion thereof into opposite drums in a manner to reverse the positions of said gears in respect to said pinion.

3. A winch, comprising: a frame having a lower horizontal portion, a vertical portion at one end of said horizontal portion, an upper horizontal portion at the upper end of said vertical portion, said upper horizontal portion and said vertical portion at their confronting ends being bifurcated; a housing detachably secured to the free ends of said upper and lower frame portions; a transmission mechanism in said housing and including a pair of spaced horizontal shafts between the upper and lower frame portions with one end journaled in said housing and the other end rotatively carried by said frame portion; two cable drums rotatively supported on said shafts within said frame; and clutches associated with those ends of said drums and said shafts opposite from the housing ends, for controlling rotation of said drums from said shafts, said clutches having parts so correlated to said frame as to be detachable from the other parts thereof upon detachment of said frame from said housing.

4. A winch, comprising: a housing having an open side; a plate detachably secured to and closing the open side of said housing; a pair of parallel spaced drums at the outer side of said plate; a pair of driving shafts extending into said drums, through said plate and into said housing; a transmission mechanism in said housing including a pinion, and a pair of intermeshing gears fixed to the adjacent ends of said shafts, one of which meshes with said pinion so as to be driven in one direction by the latter and to in turn drive the other gear in the same direction; and a driving connection between said shafts and said drums having parts separable to allow withdrawal of said shafts with said gears from said drums upon detachment of said housing from said plate, and said gears and said pinion being so constructed and arranged that by replacing said shafts in said plate and in opposite drums, the position of said gears in relation to said pinion is reversed, but again brought into mesh with each other.

HARALD D. KADZ.

REFERENCES CITED

The following references are of record in the file of this patent:

UNITED STATES PATENTS

| Number | Name | Date |
| --- | --- | --- |
| 2,312,552 | Hutchins | Mar. 2, 1943 |
| 2,138,824 | Yount | Dec. 6, 1938 |
| 2,272,917 | Lawler | Feb. 10, 1942 |
| 1,916,732 | Le Tourneau | July 4, 1933 |
| 2,321,905 | French | June 15, 1943 |
| 2,286,547 | Hutchins | June 16, 1942 |
| 1,912,645 | Le Tourneau | June 6, 1933 |
| 2,263,064 | Allin | Nov. 18, 1941 |
| 2,175,383 | Eason | Oct. 10, 1939 |
| 638,669 | Norris | Dec. 5, 1899 |
| 1,885,827 | Hottman | Nov. 1, 1932 |